United States Patent [19]

Stromiedel

[11] Patent Number: 4,659,269
[45] Date of Patent: Apr. 21, 1987

[54] FASTENING DOWEL OF PLASTICS

[75] Inventor: Konrad Stromiedel, Waldachtal, Fed. Rep. of Germany

[73] Assignee: Fischerwerke Artur Fischer GmbH & Co. KG, Tumlingen/Waldachtal, Fed. Rep. of Germany

[21] Appl. No.: 775,253

[22] Filed: Sep. 11, 1985

[30] Foreign Application Priority Data

Oct. 10, 1984 [DE] Fed. Rep. of Germany ....... 3437186

[51] Int. Cl.⁴ .............................................. F16B 13/04
[52] U.S. Cl. ...................... 411/34; 52/127.4; 411/82
[58] Field of Search ................... 411/34–38, 411/82, 258, 69; 405/261, 260; 52/127.4, 704

[56] References Cited

U.S. PATENT DOCUMENTS

| | | | |
|---|---|---|---|
| 3,016,578 | 1/1962 | Rohe | 411/82 X |
| 3,564,798 | 2/1971 | Darby et al. | 411/82 X |
| 3,964,531 | 6/1976 | Schenk | 411/82 |
| 4,185,438 | 1/1980 | Fischer | 411/82 X |
| 4,280,391 | 7/1981 | Fischer et al. | 411/82 X |
| 4,428,705 | 1/1984 | Gelhard | 411/82 |
| 4,518,290 | 5/1985 | Frichmann et al. | 405/261 X |

FOREIGN PATENT DOCUMENTS

| | | | |
|---|---|---|---|
| 2515950 | 10/1976 | Fed. Rep. of Germany | 411/258 |
| 2537644 | 2/1977 | Fed. Rep. of Germany | |
| 2749814 | 5/1979 | Fed. Rep. of Germany | |
| 2836835 | 3/1980 | Fed. Rep. of Germany | 411/82 |
| 7824051 | 9/1982 | Fed. Rep. of Germany | |
| 3209018 | 9/1983 | Fed. Rep. of Germany | 411/82 |
| 7311989 | 10/1983 | Fed. Rep. of Germany | |
| 2018929 | 10/1979 | United Kingdom | 411/38 |

*Primary Examiner*—Robert L. Wolfe
*Assistant Examiner*—Lloyd A. Gall
*Attorney, Agent, or Firm*—Michael J. Striker

[57] ABSTRACT

A fastening dowel for fastening objects to tiled plasterboard walls includes a shaft portion with expansible legs, a neck and an end flange adapted to rest against an end face of the wall. In order to prevent water from penetrating the plaster wall when the fixing dowel is used in "wet" rooms, the neck of the fixing dowel is provided with a circumferential groove which extends to both sides of the front face of the plasterboard wall, once the fixing plug has been pushed into the drilled hole, and comes to rest in the region to be sealed. A sealing composition can be injected through an injection aperture, formed in the end flange, and a longitudinal channel which opens into the circumferential groove.

4 Claims, 3 Drawing Figures

U.S. Patent     Apr. 21, 1987     4,659,269
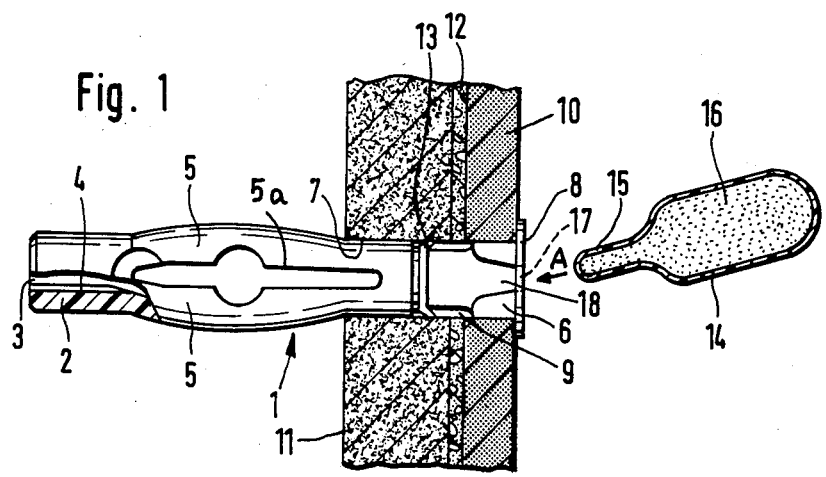
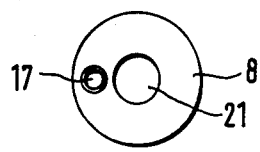
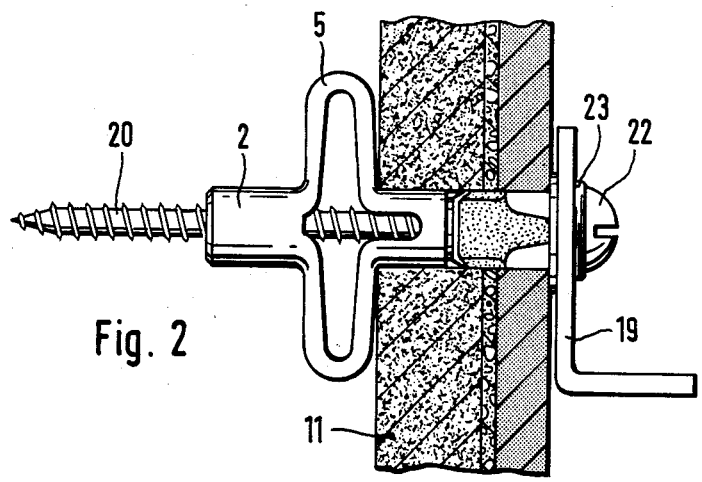

4,659,269

FASTENING DOWEL OF PLASTICS

BACKGROUND OF THE INVENTION

The invention relates to a fixing dowel pin made of plastics, particularly for fastening in tiled plasterboard walls of "wet" rooms.

A fixing dowel of the type under consideration includes an end flange which comes to rest against the outer surface of the wall, an adjoining neck, and an expansible element which can be anchored in the wall by means of a fastening screw.

In the field of the invention it has been customary to use the same fixing dowels or plugs as those used for "dry" rooms. This meets the requirements of the fastening. However, problems arise because of water which enters by way of the tile joints and which runs down through the mortar layer provided on the front of the plasterboard wall and, in the region of the fastening points, penetrates the plaster wall through the annular gap between the outer surface of the fastening plug and the wall of the drilled hole. The constant wetting of these fastening points destroys the anchorage foundation and hence the fastening.

SUMMARY OF THE INVENTION

It is an object of the present invention to provide an improved fastening dowel for use in "wet" rooms.

It is another object of this invention to provide a fastening dowel which would prevent penetration of water into the plaster wall.

These and other objects of the invention are attained by a fastening dowel of synthetic plastic material for fastening objects, particularly to tiled plasterboard walls of "wet" rooms, comprising an elongated shaft including a neck portion being received in a drilled hole of the tiled plasterboard wall, and an expansible portion for receiving a fastening screw and expandable thereby to fasten an object to said wall; and an end flange jointed to said neck portion and adapted to rest against an end face of the tiled plasterboard wall, said neck portion being formed with a circumferential groove, which, after the dowel has been inserted into said drilled hole, axially overlaps at both sides of front face of said wall, facing a tile attached thereto, said end flange having an injection aperture, and said neck portion having a longitudinal channel which opens into said circumferential groove and is connected to said aperture, said channel and said groove being sealed with a sealing composition injected through said injection aperture and received in said channel and groove.

The present invention is drawn to a fixing dowel or plug of plastics that is especially suitable for plasterboard walls, and which has a suitable neck portion for bridging the thickness of the tile and the mortar layer attached to the plasterboard wall. The circumferential groove arranged in the neck of the fixing dowel is formed at a distance from the end flange, which ensures that, once the fixing plug has been pushed into the drilled hole, the circumferential groove comes to rest at the place which is to be sealed. The width of the groove is such that the tolerances in the thickness of the tile and the mortar layer are compensated. In order to seal the hole for the fixing plug, a sealing composition, for example silicone, packed in a tube or sachet, is forced through the injection aperture in the end flange and through the longitudinal channel, into the circumferential groove. The sealing composition seals off completely the annular gap and the cavities between the outer surface of the fixing dowel and the wall of the drilled hole. This means that it is no longer possible for water, running down the front face of the sandwich-type plasterboard, to penetrate the drilled hole for receiving the fixing dowel and hence for the plaster wall to be destroyed.

The circumferential wall may have a boundary wall which is provided at an end thereof, remotest from said end flange, with a sealing lip, said sealing lip extending radially outwardly beyond an external periphery of said neck portion.

When drilling in plasterboard walls, the resulting drilled holes are generally larger than those drilled in other wall materials. The sealing flange causes the larger annular gap, that results, to be closed to such an extent that the seal is limited to the groove region. The sealing lip also allows a higher injection pressure which leads to improved filling of the annular groove and of the pores of the building material.

The longitudinal channel may widen in cross-section towards said circumferential groove. This leads to an improved channeling of the sealing composition into the circumferential groove during the injection.

The expansible portion may include two legs foldable by said fastening screw upon the insertion thereof into the dowel.

The novel features which are considered as characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

BRIEF DESCRIPTION OF THE DRAWINGS

FIG. 1 is a side view, partially in section of the fixing dowel of the present invention, inserted in a drilled hole of a plasterboard wall;

FIG. 1a is a view seen from arrow A of FIG. 1; and

FIG. 2 is a side view of the fixing dowel of the invention in a completely assembled condition in the drilled hole of the plasterboard wall.

DETAILED DESCRIPTION OF THE PREFERRED EMBODIMENTS

Referring now to the drawings in detail, and firstly to FIG. 1 thereof, it will be seen that a fixing dowel, made of synthetic plastic material and designated in total by reference numeral 1, comprises a shaft 2 formed with a central longitudinally drilled hole 3, at the wall of which internal elongated ribs 4, circumferentially spaced from each other, and inwardly radially protruding, are formed. Internal ribs 4 serve to receive the thread of a fastening screw 20 insertable into shaft 2 as shown in FIG. 2. Shaft 2 further has two external expansible legs 5 which are spaced from each by an elongated opening 5a and are held together by a neck portion 6 of the fixing dowel.

Reference numeral 10 designates a tile, reference numeral 11 denotes a plasterboard wall while reference numeral 12 designates a mortar layer provided between tile 10 and plaster wall 11.

At the end of the neck portion 6, is provided an end flange 8, which projects at right angles to the axis of the dowel to prevent the same from being pushed through and to seal off a drilled hole 7 receiving the neck poriton 6 of the dowel from the outside. The end flange 8 has an injection aperture 17 which is offset from the central axis of the dowel and the purpose of which will be explained below. The end flange 8 further has a central opening 21. The neck portion of the fixing dowel 1 is provided with a circumferential groove 9, the distance of which from the end flange 8 and its length are such that once the fixing dowel has been pushed into the drilled hole 7 and the end flange 8 is resting against the end face of the tile 10, the groove 9 extends to the both sides of the front face of the plasterboard wall 11.

In other words the axial length of the circumferential groove 9 is such that it overlaps the edge of the tile 10 and the end face of front wall 11, facing each other. The length or depth of the groove 9 is so selected that it is ensured that the groove would extend to the both sides of the plasterboard wall 11 in this manner even when the tiles 10 and the mortar layer 12 are of varying thicknesses. A sealing lip 13 which projects radially beyond the external periphery of the fixing dowel in the region of the neck portion 6 is arranged on that boundary wall of the circumferential groove 9 which is the remotest from the end flange 8. This produces a sealing of the annular gap formed between the surface of the outer fixing dowel and the wall of the drilled hole 7 even in the case of drilled holes that prove to be oversized. The circumferential groove 9 is filled with a packing formed by a sealing composition 16 packed, in the exemplified embodiment, in a sachet or bag 14 which has a nozzle attachment 15. When the nozzle seal is cut off, the sealing composition 16 is injected through the injection aperture 17 provided in the end flange 8 of the fixing dowel 1, and an injection channel constituted by a longitudinal channel 18 formed in the neck portion 6, into the circumferential groove 9. The widening of the longitudinal channel 18 towards the circumferential groove 9 facilitates the guiding of the sealing composition 16 when it is injected into the groove 9. The circumferential groove 9 and channel 18 filled with the sealing or packing composition 16 are shown in FIG. 2. A seal is thus produced in the region of the front face of the plasterboard wall 11, which prevents the penetration of water into the drilled hole 7 for receiving the fixing dowel.

After the sealing operation has been completed, in order to secure an object 19 as shown in FIG. 2, a fastening screw 20 is screwed into the central longitudinal drilled hole 3 of the shaft 2. This causes the external legs 5 of shaft 2 to bend radially outwards at the bending point and to fold up axially. An abutment of a large surface area, which permits high pullout properties when used with sandwich-type plasterboard, is thus formed at the back of the plasterboard wall 11. In order to seal the screw opening 21 in the fixing dowel 1 it is advantageous to additionally mount a rubber washer 23 under a screw head 22 of the fastening screw 20.

It will be understood that each of the elements described above, or two or more together, may also find a useful application in other types of fastening dowels differing from the types described above.

While the invention has been illustrated and described as embodied in a fastening dowel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fastening dowel, of synthetic plastic material, in combination with a fastening screw received in the fastening dowel for fastening objects to a tiled plasterboard wall of a "wet" room, which wall has a drilled hole and a front face to which a tile is attached, the dowel comprising an elongated shaft including a neck portion to be received in the drilled hole of the tiled plasterboard wall, and an expansible poriton receiving the fastening screw and expandable thereby to fasten an object to said plasterboard wall; and an end flange joined to said neck portion and adapted to rest against an end face of the tile attached to said front face, said neck portion having a circumferential groove, said groove being in an axial direction of the dowel of such a length that it, after the dowel has been inserted into said drilled hole, axially overlaps at both sides thereof said front face of said wall and an edge of the tile facing said front face, said end flange having and injection aperture, and said neck portion having a longitudinal channel which opens into said circumferential groove and is connected to said aperture, said channel and said groove being sealed with a sealing composition injection through said injection aperture and received in said channel and said groove.

2. The fastening dowel as defined in claim 1, wherein said circumferential groove has a boundary wall which is provided at an end thereof, remotest from said end flange, with a sealing lip, said sealing lip extending radially outwardly beyond an external periphery of said neck portion.

3. The fastening dowel as defined in claim 1, wherein said longitudinal channel widens in cross-section towards said circumferential groove.

4. The fastening dowel as defined in claim 1, wherein said expansible portion includes two legs foldable by said fastening screw upon the insertion thereof into the dowel.

* * * * *